United States Patent
Nakamura et al.

[11] Patent Number: 5,925,295
[45] Date of Patent: Jul. 20, 1999

[54] PRE-PLASTICIZING TYPE INJECTION MOLDING MACHINE AND CONTROL METHOD THEREFOR

[75] Inventors: Nobuyuki Nakamura; Kishihiro Yamaoka, both of Nagano, Japan

[73] Assignee: Nissei Plastic Industrial Co., Ltd., Nagano-Ken, Japan

[21] Appl. No.: 08/842,489

[22] Filed: Apr. 24, 1997

[30] Foreign Application Priority Data

Apr. 30, 1996 [JP] Japan ................................. 8-109705

[51] Int. Cl.⁶ .......................................... B29C 45/48
[52] U.S. Cl. ................................. 264/40.1; 264/328.19; 264/349; 425/145; 425/205; 425/557; 425/587; 366/78; 366/91
[58] Field of Search ............................ 264/40.1, 40.5, 264/40.7, 328.1, 328.19, 349; 425/145, 146, 205, 585, 587, 557; 366/78, 91

[56] References Cited

U.S. PATENT DOCUMENTS

| | | | |
|---|---|---|---|
| 3,115,681 | 12/1963 | Hendry | 425/587 |
| 3,296,353 | 1/1967 | Nouel | 425/557 |
| 3,481,001 | 12/1969 | Stillhard | 425/205 |
| 4,557,683 | 12/1985 | Meeker et al. | 425/557 |
| 4,867,665 | 9/1989 | Wada | 425/205 |
| 4,909,724 | 3/1990 | Sonoda et al. | 425/557 |
| 5,253,994 | 10/1993 | Zweig et al. | 425/205 |
| 5,286,187 | 2/1994 | Niimi et al. | 425/205 |
| 5,366,366 | 11/1994 | Yokohama | 425/145 |

FOREIGN PATENT DOCUMENTS 7-106586   11/1995   Japan .

OTHER PUBLICATIONS

Rosato et al., Injection Molding Handbook, 2nd edition, International Thomson Publishing, pp. 156 and 157, 1995.

*Primary Examiner*—Jill L. Heitbrink
*Attorney, Agent, or Firm*—Birch, Stewart, Kolasch, & Birch, LLP

[57] ABSTRACT

A pre-plasticizing type injection molding machine includes a plasticizing device for plasticizing a molding material supplied from a hopper by a first screw disposed within a first barrel, an injection device 8 for measuring a molten resin supplied from the plasticizing device 5 and for injecting the measured molten resin by a second screw disposed within a second barrel. A switching valve is provided in a resin passage between a resin outlet of the plasticizing device and a resin inlet of the injection device, and an accumulation device is provided for housing a pushing plunger having a stock chamber communicated with the resin passage at a position between the switching valve 10 and the resin outlet of the plasticizing device. The injection molding machine further includes a control portion for driving the first screw for continuous rotation during the molding step, closing the switching valve and shifting the second screw forward during an injection step, and opening the switching valve, driving the second screw for rotation and driving the pushing plunger forward during a measuring step. Thus, by continuous operation of the plasticizing device, the performance of the plasticizing device can be maximized. In conjunction therewith, the degree of mixing and uniformity of a composite resin can be enhanced.

7 Claims, 4 Drawing Sheets

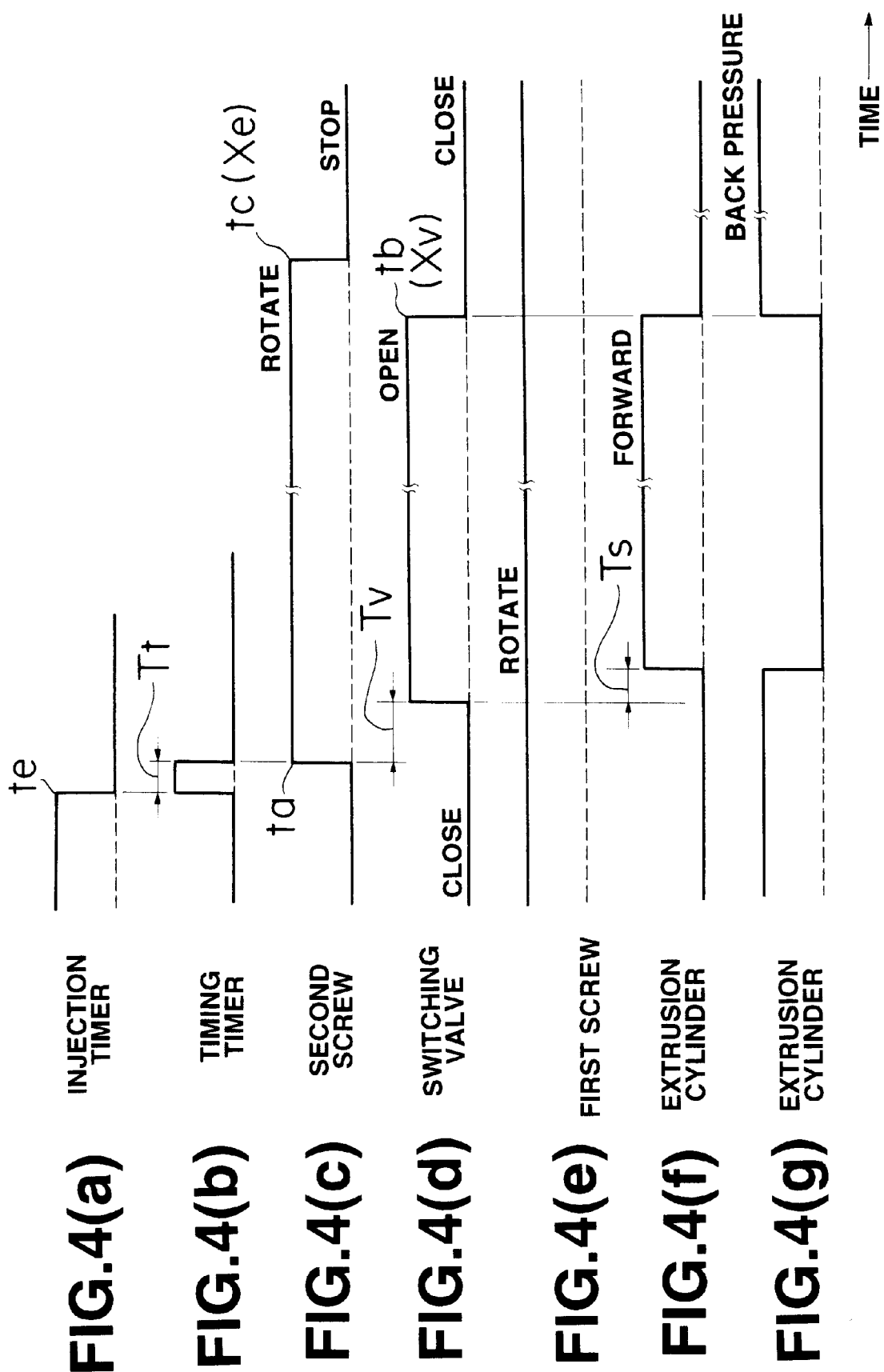

PRE-PLASTICIZING TYPE INJECTION MOLDING MACHINE AND CONTROL METHOD THEREFOR

BACKGROUND OF THE INVENTION

1. Field of the Invention

The present invention relates to a pre-plasticizing type injection molding machine which includes a plasticizing device separately from an injection device, and control method therefor.

2. Description of the Related Art

Conventionally, as an injection molding machine for molding a composite resin, in which an additive material, such as magnetic metal pieces, glass fiber, pigment and so forth, is admixed with a synthetic resin, a mixing injection molding apparatus has been disclosed in Japanese Examined Patent Publication No. Heisei 7(1995)-106586.

The mixing injection molding apparatus disclosed in the above-identified publication is called as a screw and screw type pre-plasticizing injection molding machine. Such injection molding apparatus has a separate plasticizing device (kneading machine) in addition to a general in-line screw-type injection molding machine (injection machine). A molding material supplied from a hopper is sufficiently plasticized and mixed by a screw rotating in a barrel. Furthermore, the material is mash-sheared by a stationary disc and a rotary disc by a dividing-and-distributing action. In the injection molding machine, a molten resin (composite resin) supplied from the plasticizing device is measured and injected.

However, in the above-mentioned conventional mixing injection molding apparatus, in order to operate the plasticizing device in synchronism with the molding operation cycle of the injection apparatus, the operation of the plasticizing device cannot be continuous and inherently becomes intermittent. Therefore, the performance of the plasticizing device cannot be maximized. Therefore, there is a limitation in enhancing the degree of mixing and uniformity of the composite resin to make it impossible to obtain a high and uniform quality molded product.

SUMMARY OF THE INVENTION

It is an object of the present invention to provide a pre-plasticizing type injection molding machine which can maximize performance of a plasticizing device by continuous operation thereof, and a control method therefor.

Another object of the present invention is to provide a pre-plasticizing type injection molding machine which can produce a molded product with high quality and high uniformity by enhancing the degree of mixing and uniformity of a composite resin.

In order to accomplish the above-mentioned objects, a pre-plasticizing type injection molding machine, according to the present invention, comprises a plasticizing device for plasticizing a molding material supplied from a hopper by a first screw disposed within a first barrel, an injection device for measuring a molten resin supplied from the plasticizing device and injecting the measured molten resin by a second screw disposed within a second barrel, a switching valve provided in a resin passage between a resin outlet of the plasticizing device and a resin inlet of the injection device, an accumulation device housing a pushing plunger and having a stock chamber communicated with the resin passage at a position between the switching valve and the resin outlet of the plasticizing device, and a control portion driving the first screw for continuous rotation during a molding step, closing the switching valve and shifting the second screw forward during an injection step, and opening the switching valve, driving the second screw for rotation and driving the pushing plunger forward during a measuring step.

In this case, the plasticizing device may include a kneading machine constructed by a combination of a rotation side kneading disc provided at a part of the first screw and a stationary side kneading disc provided on the inner periphery of the first barrel.

On the other hand, a control method of the pre-plasticizing type injection molding machine according to the present invention, applicable for the foregoing pre-plasticizing type injection molding, comprises the steps of driving the first screw for continuous rotation during a molding step, closing the switching valve and shifting the second screw forward during an injection step; and opening the switching valve, driving the second screw for rotation and driving the pushing plunger forward during a measuring step.

In this case, in the measuring step, the switch is opened after expiration of a preliminarily set valve control period from initiation of rotation of the second screw.

In the measuring step, the pushing plunger is driven forward with a predetermined time delay after opening of the switching valve, and the switching valve is closed when the second screw reaches a preliminarily set valve control position located at a given distance ahead of a measuring terminating position, and the rotation of the second screw is terminated when the second screw reaches the measuring terminating position. Rotation speed of the first screw, rotation speed of the second screw and pushing speed of the pushing plunger are preliminarily set so that a resin amount accumulated in the stock chamber in each molding cycle becomes constant.

By continuos operation of the plasticizing device during the molding step, performance of the plasticizing device can be maximized to improve the degree of mixing and uniformity of the molding material (composite resin). On the other hand, during the injection step, by closing the switching valve, the molten resin discharged from the plasticizing device is accumulated in the stock chamber of the accumulation device, and injection is performed by driving the second screw forward in the injection device. On the other hand, in the measuring step, the switching valve is open, the pushing plunger is driven forward, and the molten resin accumulated in the stock chamber and the molten resin discharged from the plasticizing device are supplied to the injection device together. Measuring is performed by rotation of the second screw.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will becomes apparent to those skilled in the art from this detailed description.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to be present invention, but are for explanation and understanding only.

In the drawings:

FIGS. 4(a) to 4(g) are timing chart showing operations of respective portions in the preferred embodiment of the pre-plasticizing type injection molding machine according to the present invention.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

At first, a construction of the preferred embodiment of a pre-plasticizing type injection molding machine 1 according to the present invention will be discussed with reference to FIG. 1.

Figure 1:
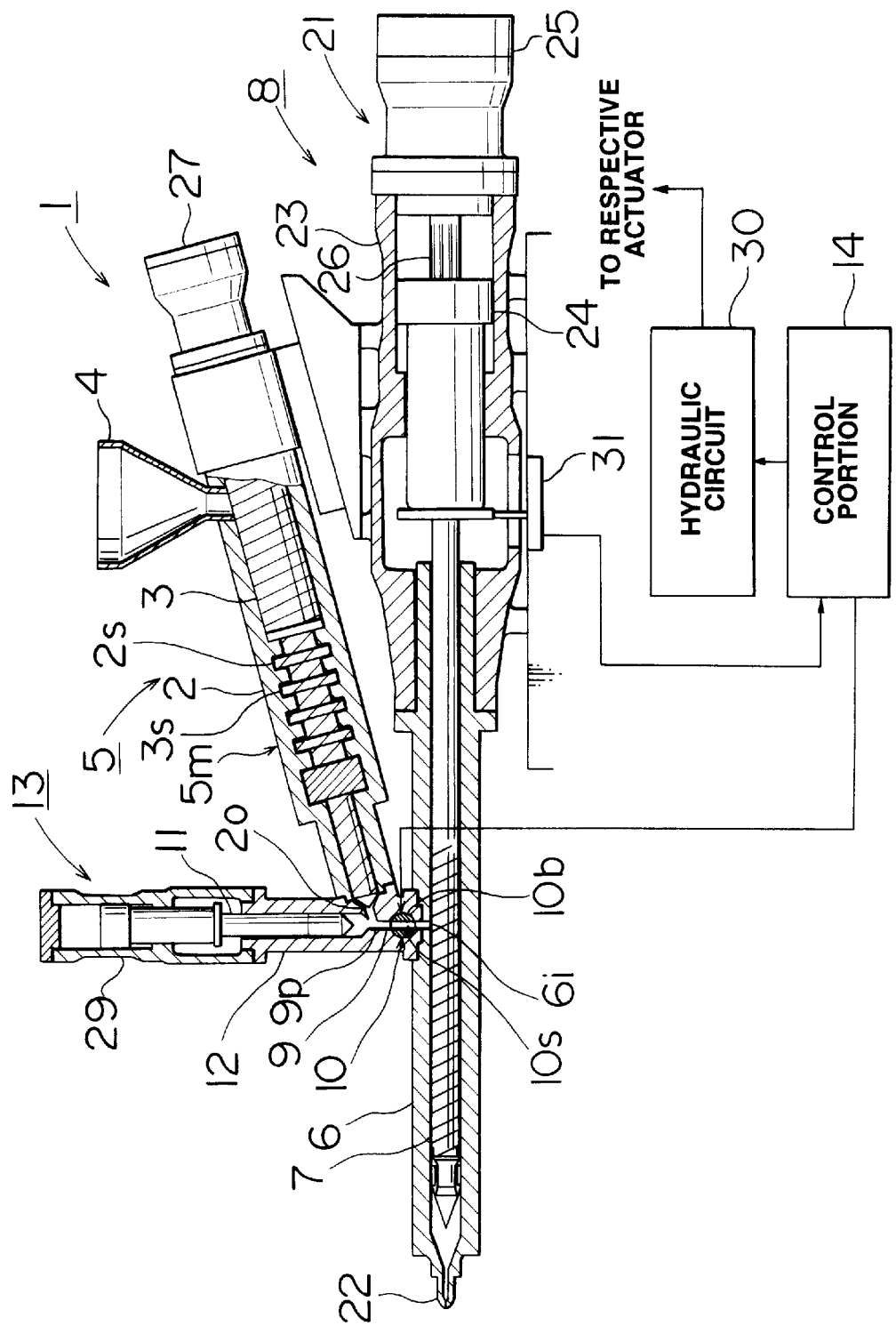
FIG. 1 is a partially sectioned side elevation of the preferred embodiment of a pre-plasticizing type injection molding machine according to the present invention.

In FIG. 1, the reference numeral 1 denotes a pre-plasticizing type injection molding machine excluding a mold clamping apparatus, according to the present invention. The re-plasticizing type injection molding machine 1 generally comprises an injection apparatus, 8, a plasticizing device 5 and an accumulation apparatus 13.

An injection apparatus 8 has a second barrel 6 at the front portion. Within the second barrel 6, a second screw 7 is housed. The rear end of the second barrel 6 is mounted on a screw driving portion 21 which drives the second screw 7. The second barrel 6 has an injection nozzle 22 at the front end, and is provided with a resin inlet 6i at the rear portion. Furthermore, the screw driving portion 21 has an injection cylinder 23. The front end of a piston 24 disposed within the injection cylinder 21 is coupled with the rear end of the second screw 7. An oil motor 25 is mounted on the rear end of the injection cylinder 23. A rotary output shaft 26 of the oil motor 25 is splined with the rear end of the piston 24. The injection cylinder 23 drives the second screw 7 in forward and rearward directions. Furthermore, the oil motor 25 rotatably drives the second screw 7.

On the upper end of the screw driving portion 21, the plasticizing device 5 is arranged. The plasticizing device 5 has a first barrel 2 at the front portion. A first screw 3 is disposed within the first barrel 2. The first barrel 2 is descended frontwardly to have a resin outlet 2o at the front end. The first barrel 2 has a hopper 4 for supplying a molding material at the rear portion. An oil motor 27 is provided at the rear end of the first barrel 2. A rotary output shaft of the oil motor 27 is coupled with the rear end of the first screw 3. The oil motor 27 rotatably drives the first screw 3.

Furthermore, a kneading machine 5m is provided at the intermediate portion of the first barrel 2. The kneading machine 5m is constructed by a combination of a plurality of rotation side kneading discs 3s . . . provided in one portion of the first screw 3, and a plurality of stationary side kneading discs 2s . . . provided on the inner peripheral surface of the first barrel 2 to be formed into annular shape with coaxially opposing surfaces of the rotation side kneading discs 3s . . . . On both surfaces of respective kneading discs 2s . . . and 3s . . . alternately and radially extending ridges and dents are formed. Furthermore, the molding material is subject to mask-shearing and a dividing and distributing action.

On the other hand, at the upper end of the resin inlet 6i in the second barrel 6, the vertically standing accumulation device 13 is provided. The accumulation device 13 has a stock chamber 12 mounted on the second barrel 6. Within the stock chamber 12, a pushing plunger 11 is disposed. On the upper end of the stock chamber 12, a pushing cylinder 29 for driving the pushing plunger 11 forward (downward) is provided at the upper end of the stock chamber 12. It should be noted that the front end of the first barrel 2 is mounted at the lower end of the stock chamber 12.

The resin outlet 2o of the first barrel 2 and the resin inlet 6i of the second barrel 6 are continuously connected via a resin passage 9. At the intermediate position of the resin passage 9, a switching valve 10 is provided. The switching valve 10 has a rotary type valve body 10b defining a resin passage 10s for opening and closing the resin passage 9 per every 90° of rotation. Furthermore, in a resin passage 9p between the switching valve 190 and the resin outlet 2o, the inside of the stock chamber 12 is communicated.

On the other hand, the reference numeral 30 denotes a hydraulic circuit connected to respective actuators, namely the injection cylinder 23, the oil motor 25 and 27 and the pushing cylinder 29. Also, a control portion 14 is provided. The control portion 14 is connected to the hydraulic circuit 30 and the switching valve 10 to perform various sequence control discussed later. It should be noted that the reference numeral 31 denotes a position sensor for detecting the position of the first screw 7, which position sensor is connected to the control portion 14.

Figure 2:
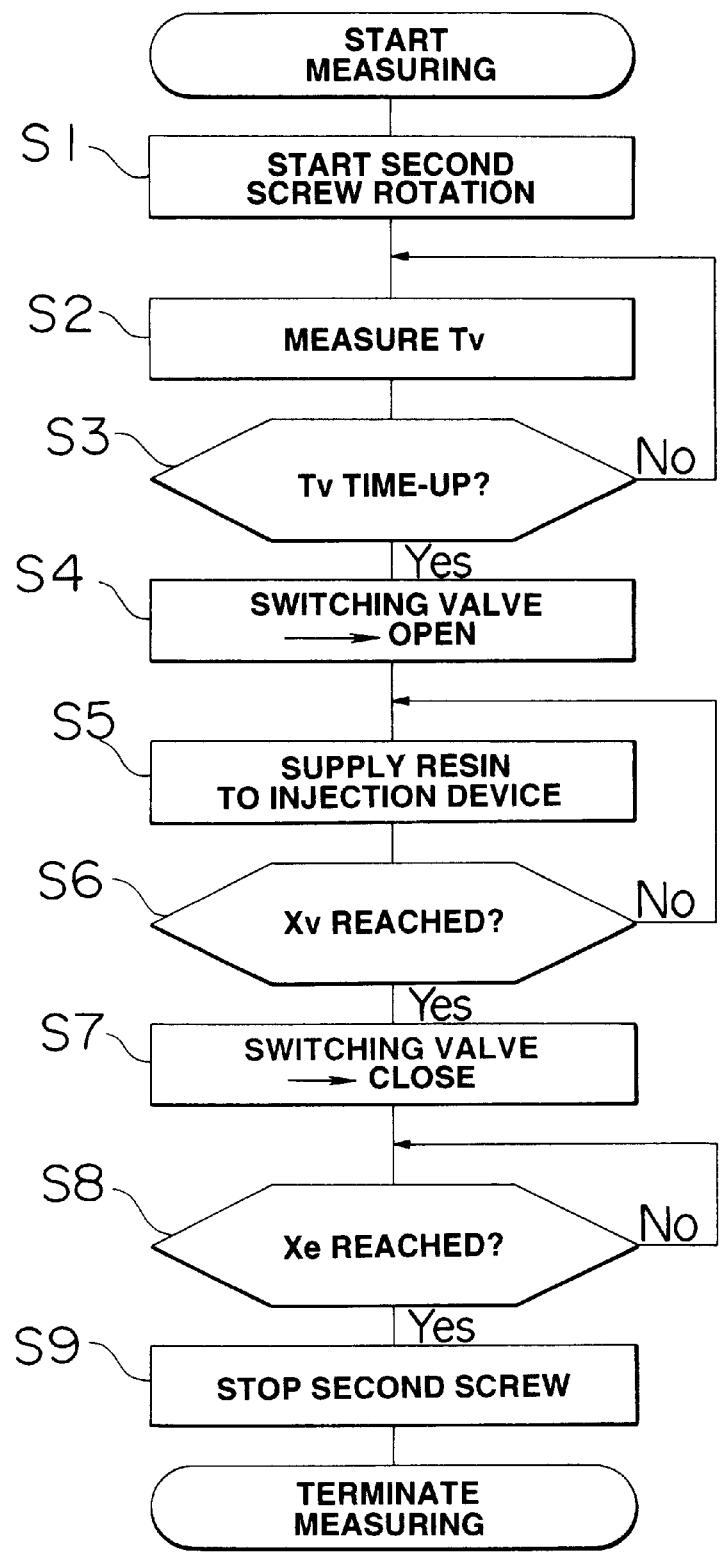
FIG. 2 is a flowchart showing a procedure in a measuring process in the preferred embodiment of a control method of a pre-plasticizing type injection molding machine according to the present invention.

Next, operation of the preferred embodiment of the pre-plasticizing type injection molding machine including the preferred control method according to the present invention, will be discussed with reference to FIGS. 1 to 4, and particularly to the flowchart shown in FIG. 2.

It should be noted that the first screw 3 is continuously rotated throughout a molding step, namely an injection step and a measuring step (see FIG. 4(e)).

Considering the case where the injection step is just completed, an injection timer causes time-up at a timing to terminate the injection step. When a timing period Tt to be measured by a timing timer shown in FIG. 4(b) expires, a measuring step is initiated.

In the measuring step, after expiration of the timing period Tt, rotation of the second screw 7 is initiated at a timing ta (step S1). On the other hand, from the timing ta, a time measurement by a control timer is initiated to open the switching valve 10 when a predetermined valve control period Tv is expired (steps S2, S3 and S4). In this case, the valve control period Tv is set to an extent of several seconds. The opening timing of the switching valve 10 is slightly delayed. Thus, supply of a molten resin to the resin inlet 6i is not performed. Therefore, corresponding to the delay period, the amount of the molten resin in the vicinity of the resin inlet 6i is reduced for rotation of the second screw 7 during the delay period. This contributes to prevention of overloading by the molten resin and for promoting degassing of the molten resin.

Figure 3:
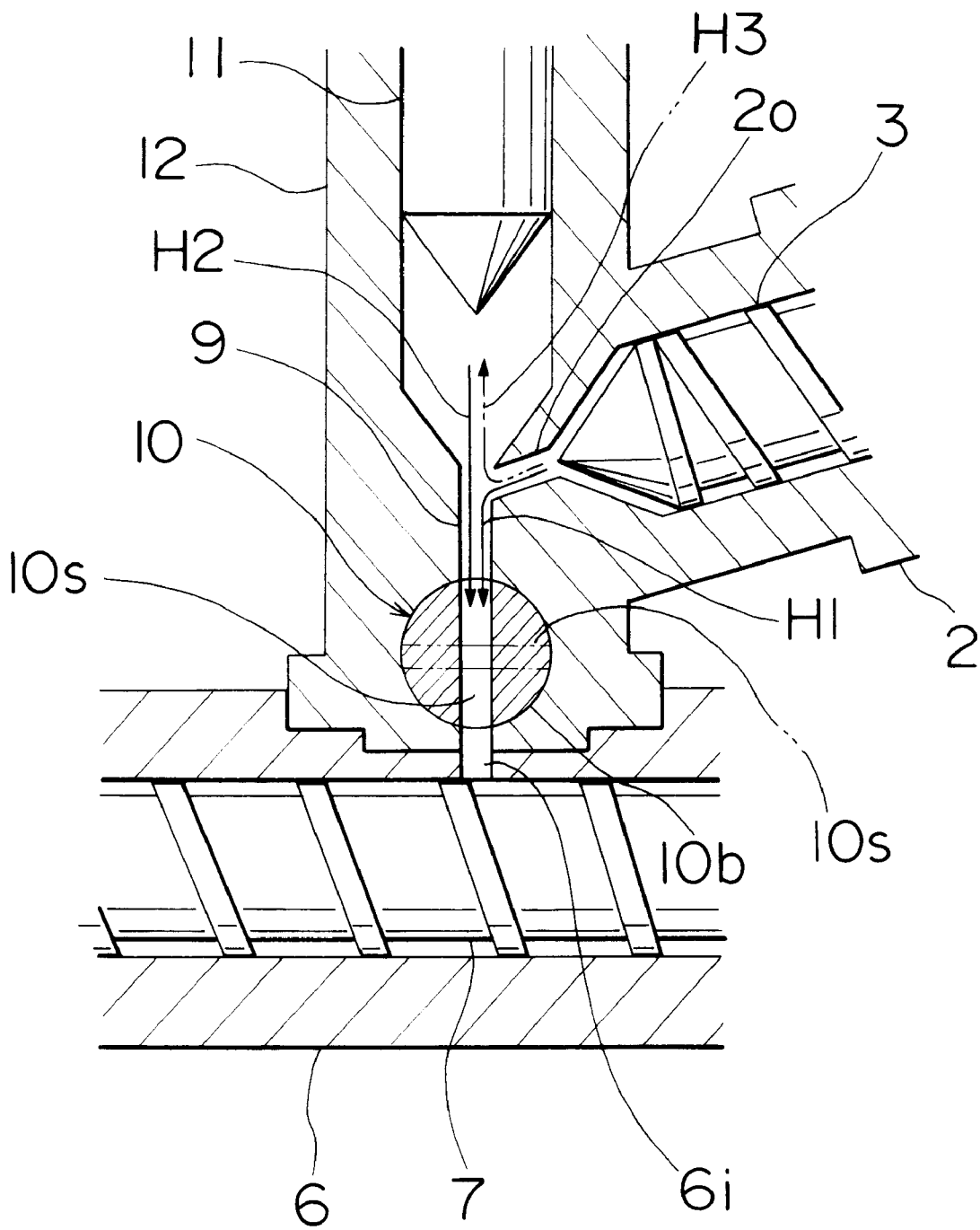
FIG. 3 is an enlarged sectional side elevation of a part f the preferred embodiment of the pre-plasticizing type injection molding machine according to the invention.

By opening the switching valve 10, the resin passage 10s of the switching valve 10 is placed at the position illustrated by the solid line in FIG. 3. As a result, the molten resin discharged from the resin outlet 2o of the plasticizing device is supplied within the second barrel 6 through a path shown by arrow H1. With a slight delay Ts from an opening command for the switching valve, the pushing cylinder 13 is actuated see FIG. 4(f). The reason is that actuation of the pushing cylinder 13 before sufficiently opening the switching valve 10 prevents the molten resin from causing surge flow. The pushing plunger 11 is moved and the molten resin in the stock chamber 12 is supplied into the second barrel 6 via a path shown by an arrow H2.

Then, the position of the second screw 7 is monitored. When the second screw 7 reaches a preliminarily set valve control position Xv which is set before a measuring termination position Xe for a predetermined distance (in the extent of several mm), operation of the pushing cylinder 13 is terminated and the switching valve 10 is closed (step S5, S6). The molten resin discharged from the plasticizing device 5 is accumulated in the stock chamber 12 through a path shown by arrow H3 in FIG. 3. Accordingly, at this timing, to the pushing plunger 11, a predetermined back pressure is applied (see FIG. 4(g)). Furthermore, the second screw 7 continues rotation and thus measuring is continued. Therefore, when the second screw 7 reaches the target measuring terminating position Xe (timing tc in FIG. 4(c)), rotation of the second screw 7 is terminated (steps S7, S8 and S9). The measuring step is therefore completed, and the process moves to the injection step.

The reason why operation of the pushing cylinder 29 at first and subsequently rotation of the second screw 7 is terminated, is the same as the reason to slightly delay the timing of opening of the switching valve 10 by setting the valve control timing Tv. This is because the amount of molten resin in the vicinity of the resin inlet 6i is reduced to suppress overloading by the molten resin and to promote degassing of the molten resin.

In order to continuously rotate the first screw 3, it becomes necessary to constantly maintain the resin amount to be accumulated in the stock chamber 12 at a predetermined amount. Therefore, rotation speeds of the first screw 3 and the second screw 7 are preliminarily set on the basis of a molding cycle period, shot amount and discharge amount of the plasticizing device 5, and the pushing speed by the pushing plunger 11 is also set preliminarily on the basis of a movable stroke of the pushing plunger 11, measuring period and so forth.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. In a pre-plasticizing type injection molding machine comprising a plasticizing device for plasticizing a molding material supplied from a hopper by a first screw disposed within a first barrel, an injection device for measuring a molten resin supplied from said plasticizing device and injecting the measured molten resin by a second screw disposed within a second barrel, a switching valve provided in a resin passage between a resin outlet of said plasticizing device and a resin inlet of said injection device, and an accumulation device housing a pushing plunger and having a stock chamber communicated with said resin passage at a position between said switching valve and said resin outlet of said plasticizing device, a controlling method comprising the steps of:

driving said first screw for continuous rotation during a molding step;

closing said switching valve and shifting said second screw forward during an injection step; and opening said switching valve, driving said second screw for rotation and driving said pushing plunger forward during a measuring step, said opening step further including opening said switching valve after expiration of a preliminary set valve control period from initiation of rotation of said second screw.

2. The control method for a pre-plasticizing injection molding machine as set forth in claim 1, wherein said driving step further includes driving said pushing plunger forward after a predetermined time delay after opening said switching valve.

3. The control method for a pre-plasticizing injection molding machine as set forth in claim 1, wherein said measuring step further includes closing said switching valve when said second screw reaches a preliminarily set valve control position located at a given distance ahead of a measuring terminating position, and terminating rotation of said second screw when said second screw reaches said measuring terminating position.

4. The control method for a pre-plasticizing injection molding machine as set forth in claim 1, wherein said method further includes the step of preliminarily setting rotation speed of said first screw, rotation speed of said second screw and pushing speed of said pushing plunger so that a resin amount accumulated in said stock chamber in each molding cycle becomes constant.

5. A pre-plasticizing injection molding machine comprising:

a plasticizing device for plasticizing a molding material, said plasticizing device comprising:
     a first barrel;
     a first screw disposed within the first barrel; and
     a kneading machine having a rotation side kneading disc and a stationary side kneading disc, wherein said machine further comprising:

an injection device having a second barrel and a second screw;

a switching valve between a resin outlet of said plasticizing device and a resin inlet of said injection device;

an accumulation device housing a pushing plunger and having a stock chamber communicated with said resin passage at a position between said switching valve and said resin outlet of said plasticizing device; and a control for controlling operation of the machine, said control driving said first screw, opening and closing said switching valve, driving said second screw, and driving said pushing plunger, wherein said switching valve is opened after a predetermined period of time from an initiation of rotation of said second screw, and said pushing plunger is driven forward after a predetermined period of time from the opening of the switching valve.

6. The pre-plasticizing injection molding machine as set forth in claim 5, wherein said switching valve is closed when said second screw reaches a predetermined valve control position located at a given distance ahead of a measuring terminating position and rotation of said second screw is terminated when said second screw reaches said measuring terminating position.

7. The pre-plasticizing injection molding machine as set forth in claim 5, wherein the rotation speed of said first and second screws, and a pushing speed of said pushing plunger are set so that a resin amount accumulated in said stock chamber in each molding cycle becomes constant.

* * * * *